United States Patent
Mikaki et al.

(10) Patent No.: US 8,383,236 B2
(45) Date of Patent: Feb. 26, 2013

(54) ZIRCONIA SINTERED BODY AND PRODUCTION METHOD THE SAME

(75) Inventors: Shunji Mikaki, Satsumasendai (JP); Kunihide Shikata, Satsumasendai (JP)

(73) Assignee: Kyocera Corporation, Kyoto (JP)

( * ) Notice: Subject to any disclaimer, the term of this patent is extended or adjusted under 35 U.S.C. 154(b) by 181 days.

(21) Appl. No.: 12/866,701

(22) PCT Filed: Feb. 6, 2009

(86) PCT No.: PCT/JP2009/052054
§ 371 (c)(1),
(2), (4) Date: Dec. 2, 2010

(87) PCT Pub. No.: WO2009/099184
PCT Pub. Date: Aug. 13, 2009

(65) Prior Publication Data
US 2011/0070441 A1     Mar. 24, 2011

(30) Foreign Application Priority Data
Feb. 7, 2008  (JP) .............................. 2008-027694

(51) Int. Cl.
*B32B 5/16*   (2006.01)
(52) U.S. Cl. ......... 428/402; 428/404; 501/102; 264/604
(58) Field of Classification Search ................. 428/402, 428/404; 501/102; 264/604
See application file for complete search history.

(56) References Cited

U.S. PATENT DOCUMENTS

| 7,148,167 B2 * | 12/2006 | Shikata et al. ................ 501/105 |
| 7,399,722 B2 * | 7/2008 | Shikata et al. ................ 501/105 |
| 2002/0010069 A1 | 1/2002 | Shinji et al. ................... 501/103 |
| 2002/0177518 A1 | 11/2002 | Kwon et al. ................... 501/103 |

FOREIGN PATENT DOCUMENTS

| JP | 61-072683 | 4/1986 |
| JP | 64-079067 | 3/1989 |
| JP | 01157462 A | 6/1989 |
| JP | 10-297968 | 11/1998 |
| JP | 2003-261376 | 9/2003 |
| JP | 2005-206421 | 8/2005 |
| JP | 2006-199586 | 8/2006 |
| WO | WO 02/081402 A1 | 10/2002 |

OTHER PUBLICATIONS

Extended European search report dated Jun. 27, 2011 for corresponding European application 09709352.0.

* cited by examiner

*Primary Examiner* — Leszek Kiliman
(74) *Attorney, Agent, or Firm* — DLA Piper LLP (US)

(57) ABSTRACT

Provided are a zirconia sintered body that has excellent mechanical characteristics, as well as semiconductivity that can allow static electricity to escape at an appropriate rate, and a manufacturing method that can manufacture the same at lower cost than in the past. The zirconia sintered body is made of 66-90 parts by weight of zirconia that contains a stabilizer, and a total of 10-34 parts by weight of iron, chromium and titanium oxides. Of the iron, chromium and titanium oxides, the proportion of iron oxide is 70-99.5 wt %, the proportion of chromium oxide is 0.4-20 wt % and the proportion of titanium oxide is 0.1-10 wt %. The combined proportion of tetragonal and cubic crystals in the zirconia crystal phase is 90% or more and the mean crystal grain size of the zirconia is 0.3-0.5 μm. The mean crystal grain size of the iron, chromium and titanium oxides is 0.5-2.0 μm. It has excellent mechanical characteristics, as well as semiconductivity.

16 Claims, No Drawings

ZIRCONIA SINTERED BODY AND PRODUCTION METHOD THE SAME

CROSS-REFERENCE TO THE RELATED APPLICATIONS

This application is a national stage of international application No. PCT/JP2009/052054, filed Feb. 6, 2009, and claims the benefit of priority under 35 USC 119 to Japanese Patent Application No. 2008-027694, filed Feb. 7, 2008, the entire contents of which are incorporated herein by reference.

TECHNICAL FIELD

The present invention relates to a zirconia sintered body having outstanding mechanical properties and semi-conductivity, which is used in the applications such as a vacuum nozzle that is a member of an electronic parts mounting apparatus used for mounting electronic parts in chip form onto a circuit substrate, tweezers for handling magnetic heads, jig and tool used in the production processes of the semiconductor manufacturing device, the magnetic head and the electronic parts, jigs to be used in the manufacturing processes or assembling processes thereof, guides for magnetic tapes and a separating claw used in image forming device and so forth.

BACKGROUND ART

Conventionally, each of an alumina sintered body, a zirconia sintered body, a silicon nitride sintered body and a silicon carbide sintered body, each of which is conventionally used as a structured article material, has been used in various technical fields, since it has both high strength and high hardness and is excellent in heat resistance and corrosion resistance. In the application where particularly high mechanical properties are required, the zirconia sintered body is used.

However, the zirconia sintered body is a material having high insulation properties. Thus, it is attempted to make the zirconia sintered body have a smaller volume resistivity by adding an electroconductive filler to the zirconia sintered body in order to apply the zirconia sintered body to a vacuum nozzle that is a member of an electronic parts mounting apparatus used for mounting electronic parts in chip form onto a circuit substrate or tweezers for handling magnetic heads, in which a treatment to remove static electricity is required.

The present applicant has already proposed a semi-conductive zirconia sintered body which comprises 60 to 90% by weight of $ZrO_2$ containing a stabilizer and 10 to 40% by weight of at least one oxide of a metal selected from Fe, Co, Ni and Cr as an electroconductivity imparting agent, and which has a volume specific resistance in the range from $10^5$ to $10^9$ ohm-cm as shown in Patent Document 1. The semi-conductive zirconia sintered body can dissipate static electricity at a moderate rate without greatly reducing the mechanical properties of zirconia, so that it is not worn or damaged within a short time, and thus it can be suitably used over a long period of time.

Patent Document 2 proposes an ESD (electrostatic discharge) dissipative ceramic composition formed by sintering a mixture comprising a tetragonal zirconia polycrystal (TZP) and one or more resistivity modifiers for a sufficient time and at a sufficient temperature to achieve at least 99 percent of the theoretical density thereof, wherein the resistivity modifier comprises from about 5% by volume to 60% by volume of the mixture and is selected from the group consisting of the conductive materials, the semiconductive materials and the mixtures thereof; and wherein the ESD dissipative ceramic composition has a volume specific resistivity ranging from $10^3$ to $10^{11}$ Ohm-cm, a flexural strength of at least 500 MPa, and a voltage decay time of less than 500 ms. Moreover, Patent Document 2 discloses ZnO, $SnO_2$, $ZrO_2$, $Y_2O_3$, $Al_2O_3$, ZrC, SiC, $Fe_2O_3$ and $BaFe_{12}O_{19}$, $LaMnO_3$ and $LaCrO_3$ as the resistivity modifier, and the ceramic composition has an L* color measurement of at least 50 using the CIE 1976 L*a*b* scale on an LKE colorimeter. According to the ESD dissipation ceramic of Patent Document 2, various demands for the resistivities relating to various applications are satisfied, and ESD dissipation ceramics having various colors can be provided.

Patent Document 3 proposes a zirconia sintered body comprising at least 80 to 95% by weight of $ZrO_2$ containing an stabilizer and 5 to 20% by weight of $TiO_2$ as a conductivity imparting agent and has a volume specific resistivity ranging from $10^6$ to $10^{10}$ Ohm-cm. In addition, Patent Document 3 discloses, as its production method of a zirconia sintered body, a method comprising, performing sintering of the matrix under an oxidative atmosphere and performing a reduction sintering under an atmosphere containing Ar gas under a normal pressure or a high pressure, thereby adding a color similar to a black color to the zirconia sintered body. According to the zirconia sintered body, it is provided a zirconia sintered body, which is capable to dissipate static electricity at moderate rate without greatly reducing the mechanical properties of zirconia sintered body by using $TiO_2$ which is a light metal oxide.

In addition, Patent Document 4 proposes a zirconia sintered body based on $ZrO_2/Y_2O_3$, in which $ZrO_2$ mainly comprises a crystal phase of a tetragonal phase zirconia, which provides an electroconductive zirconia sintered body having a high strength, $Y_2O_3/ZrO_2$ molar ratio in the range from 1.5/98.5 to 4/96, Ti/Zr atom ratio in the range from 0.3/99.7 to 16/84, an average crystal grain diameter of zirconia not more than 2 μm (micrometers) and a porosity of the sintered body not more than 2%. Moreover, Patent Document 4 discloses, as its production method of the electroconductive and high strength zirconia sintered body, a method comprising sintering a raw matrix at a temperature in the range from 1250° C. to 1700° C. under an atmosphere comprising any of selected from the group consisting of an inert gas atmosphere, vacuum atmosphere, N2 atmosphere, hydrogen containing atmosphere and a hydrous atmosphere, thereafter subjecting the matrix to a HIP treatment below 1600° C. under an inert gas atmosphere. According to the electroconductive and high strength zirconia sintered body, it is capable to develop the electroconductivity by adding very slight amount of electroconductive substance to the zirconia sintered body, and to provide the electroconductive and high strength zirconia sintered body having improved properties without sacrificing the corrosion-resistant characteristic and the mechanical properties which are inherent to the matrix.

Patent Document 1: Japanese Patent Unexamined Publication No. 10-297968,
Patent Document 2: Japanese Patent Unexamined Publication No. 2006-199586,
Patent Document 3: Japanese Patent Unexamined Publication No. 2003-261376,
Patent Document 4: Japanese Patent Unexamined Publication No. 2005-206421.

SUMMARY OF THE INVENTION

Problems to be Solved by the Invention

The semi-conductive zirconia sintered body proposed by Patent Document 1 has semi-conductivity and high strength, toughness and hardness and is suitable for the application of a structural part material which requires a function to remove static electricity. However, as the electronic parts in chip shape or the magnetic heads which are works comes to be downsized, it has been required for the vacuum nozzle that is a member of an electronic parts mounting apparatus used for mounting chip form electronic parts onto a circuit substrate or tweezers for handling magnetic heads to be thin, light and small and simultaneously to have improved mechanical properties so as to avoid formation of cracks due to contacting with the chip form electronic parts or the magnetic heads. In addition, as the conveying time of the chip form electronic parts becomes shortened, it is required to dissipate static electricity at moderate rate within a limited period of time, so that the demand range of the volume specific resistance value has become narrow.

The ESD dissipation ceramic disclosed by Patent Document 2 satisfies various demands for various resistivities relating to various applications. Since the ceramic composition has an L* color measurement of at least 50 using the CIE 1976 L*a*b* scale on an LKE colorimeter, there have been problems that the color of the tip part of the vacuum nozzle is too bright when the ceramic composition is used for the vacuum nozzle that is a member of an electronic parts mounting apparatus used for mounting chip form electronic parts onto a circuit substrate, so that distinction accuracy of the vacuum nozzle from mounted product by the image recognition using a CCD camera have reduced, thereby operating rate of the apparatus also have decreased.

With regard to the zirconia sintered body proposed by Patent Document 3 and the electroconductive and high strength zirconia sintered body proposed by Patent Document 4, it is required to perform sintering of the matrix under an oxidative atmosphere and perform a reduction sintering under an atmosphere containing Ar gas under a normal pressure or a high pressure, or sintering the raw matrix under an atmosphere comprising any of selected from the group consisting of an inert gas, vacuum, N2, hydrogen containing atmosphere and a hydrous atmosphere, thereafter subjecting the matrix to a HIP treatment under an inert gas atmosphere. Thus, the equipment for the HIP treatment or the sintering under vacuum or reducing atmosphere and the number of the steps are needed, thereby caused a problem that the manufacturing cost increases.

The present invention has been devised to dissolve the above problems, so that an object of the present invention is to provide a zirconia sintered body having outstanding mechanical properties and semi-conductivity, which can dissipate static electricity at a moderate rate. Another object of the present invention is to provide a method for manufacturing the above zirconia sintered body at a reduced cost rather than that of the conventional methods.

Means for Solving the Problem

The zirconia sintered body of the present invention comprises a zirconia that contains a stabilizer in the range from 66 to 90 parts by mass and oxides of iron, chromium and titanium in total in the range from 10 to 34 parts by mass, wherein among the oxides of iron, chromium and titanium, a proportion of oxides of iron is in the range from 70 to 99.5% by mass, a proportion of oxides of chromium is in the range from 0.4 to 20% by mass and the proportion of oxides of titanium is in the range from 0.1 to 10% by mass, wherein the combined proportion of tetragonal and cubic crystal phases in the zirconia crystal phase is not less than 90%, and wherein the zirconia has an average crystal grain size of from 0.3 to 0.5 μm and the oxides of iron, chromium and titanium have an average crystal grain size of from 0.5 to 2.0 μm.

Effect of the Invention

According to the zirconia sintered body of the present invention, it is provided a zirconia sintered body, which comprises a zirconia that contains a stabilizer in the range from 66 to 90 parts by mass and oxides of iron, chromium and titanium in total in the range from 10 to 34 parts by mass, wherein among the oxides of iron, chromium and titanium, the proportion of oxides of iron is in the range from 70 to 99.5% by mass, the proportion of oxides of chromium is in the range from 0.4 to 20% by mass and the proportion of oxides of titanium is in the range from 0.1 to 10% by mass, wherein the combined proportion of tetragonal and cubic crystal phases in the zirconia crystal phase is not less than 90%, and wherein the zirconia sintered body has an average crystal grain size of from 0.3 to 0.5 μm and the oxides of iron, chromium and titanium have an average crystal grain size of from 0.5 to 2.0 μm, so that a zirconia sintered body having outstanding mechanical properties and semi-conductivity can be obtained.

BEST MODE EMBODIMENT OF THE INVENTION

Hereinafter, embodiments of the zirconia sintered body of the present invention will be explained.

In the zirconia sintered body of the present invention, it is important that the zirconia sintered body comprises a zirconia that contains a stabilizer in the range from 66 to 90 parts by mass and oxides of iron, chromium and titanium in total in the range from 10 to 34 parts by mass, wherein among the oxides of iron, chromium and titanium, the proportion of oxides of iron is in the range from 70 to 99.5% by mass, the proportion of oxides of chromium is in the range from 0.4 to 20% by mass and the proportion of oxides of titanium is in the range from 0.1 to 10% by mass, wherein the combined proportion of tetragonal and cubic crystal phases in the zirconia crystal phase is not less than 90%, and wherein the zirconia sintered body has an average crystal grain size of from 0.3 to 0.5 μm and the oxides of iron, chromium and titanium have an average crystal grain size of from 0.5 to 2.0 μm.

Here, as the stabilizer which can dissolve in the crystal of zirconia thereby stabilize the crystal phase, and which is capable to make the combined proportion of tetragonal and cubic crystal phases in the zirconia crystal phase not less than 90% and contributes to improve the mechanical properties, compounds of a metal selected from the group consisting of yttrium (Y), cerium (Ce), dysprosium (Dy), erbium (Er), calcium (Ca) and magnesium (Mg) can be used.

Thus, in the zirconia sintered body of the present invention, the outstanding mechanical properties are resulted from the matter comprising the zirconia that contains a stabilizer in the range from 66 to 90 parts by mass. In addition, an electroconductive property is imparted to the zirconia sintered body having semi-conductivity which has a volume specific resistance value from $10^5$ to $10^8$ due to comprising a total of 10 to 34 parts by mass of oxides of iron, chromium and titanium.

When the zirconia sintered body contains oxides of iron, chromium and titanium in total in an amount of less than 10 parts by mass, the total content of iron, chromium and titanium, which impart electroconductive property to the zirconia sintered body, is so low that the effect of lowering the volume specific resistance value is decreased. Thus, there is a tendency that dissipation of static electricity becomes difficult. When the zirconia sintered body contains oxides of iron, chromium and titanium in total in an amount more than 34 parts by mass, the amount of zirconia decreases, so that the mechanical properties of the zirconia sintered body tend to be lowered. Furthermore, it is likely that the volume specific resistance value is decreased to less than $10^5$ Ohm-cm, thereby static electricity may dissipate at once by spark discharge from the vacuum nozzle or tweezers formed from the zirconia sintered body of the present invention, thus electronic parts or magnetic heads which are the devices or works may suffer from defects.

It is important that the zirconia sintered body of the present invention comprises oxides of iron, chromium and titanium in total in the range from 10 to 34 parts by mass, and in addition, the proportion of oxides of iron is 70 to 99.5% by mass, the proportion of oxides of chromium is 0.4 to 20% by mass, and the proportion of oxides of titanium is 0.1 to 10% by mass among, the oxides of iron, chromium and titanium. When the proportion of oxides of iron is less than 70% by mass, it is likely that the effect to decrease the volume specific resistance value becomes small.

In addition, when the proportion of the oxides of iron is more than 99.5% by mass, the proportion of the oxides of chromium and titanium becomes less than 0.5% by mass, thereby the mechanical properties of zirconia sintered body tend to decrease. Since the proportion of the oxides of iron is in the range from 70 to 99.5% by mass, the effect of lowering the volume specific resistance value is obtained. In addition, although the reason is not clear, the oxides of, chromium and titanium form any compounds together with the impurities contained in the oxides of iron or zirconia. Thus, it is contemplated that the compounds inhibit the grain growth of oxides of iron, thereby lowering of the mechanical properties are inhibited.

When the proportion of the oxides of titanium is less than 0.1% by mass, it becomes difficult to lower the proportion of the monoclinic crystal phase on the surface of the zirconia sintered body, thereby the workability of the surface tends to be decreased. On the other hand, when the proportion of the oxides of titanium is more than 10% by mass, the grain growth of zirconia starts, thereby the mechanical properties tend to be decreased. In addition, when the proportion of the oxides of chromium is less than 0.4% by mass, it becomes difficult to inhibit the grain growth of oxides of iron during sintering, thereby the mechanical properties of zirconia sintered body tends to be decreased. On the other hand, when the proportion of the oxides of chromium is more than 20% by mass, the sintering property of zirconia sintered body deteriorates due to the poor sinterability of oxides of chromium. Thereby, it becomes difficult to form a densified zirconia sintered body, so that the mechanical properties of zirconia sintered body tends to be decreased. In addition, the composition of the zirconia sintered body can be obtained by fluorescent X-ray analysis or ICP emission spectrochemical analysis.

Moreover, it is important that the combined proportion of tetragonal and cubic crystal phases in the zirconia crystal phase is 90% or more. When the above ratio is 90% or more, the zirconia sintered body is enabled to have excellent mechanical properties. In addition, the above ratio can be calculated according to the following formula, after performing X-ray diffraction measurement and using the obtained reflection peak intensity on (111) plane and (11-1) plane of the monoclinic crystal phase and the reflection peak intensity on (111) plane of the tetragonal and cubic crystal phases in the zirconia crystal phase.

$$(It(111)+Ic(111))/(Im(111)+Im(11\text{-}1)+It(111)+Ic(111))*100$$

In the above formula, Im(111) is a reflection peak strength (111) of monoclinic zirconia, Im(11-1) is a reflection peak strength (11-1) of monoclinic zirconia, It(111) is a reflection peak strength (111) of tetragonal zirconia, and Ic(111) is a reflection peak strength (111) of cubic zirconia.

Moreover, it is important that the average crystal grain size of zirconia is in the range from 0.3 to 0.5 μm, and the average crystal grain size of the oxides of iron, chromium and titanium is in the range from 0.5 to 2.0 μm. When the average crystal grain size of zirconia is less than 0.3 μm or the average crystal grain size of the oxides of iron, chromium and titanium is less than 0.5 μm, the crystal grain size is too small. Thus, the workability rate in the working of the surface of the zirconia sintered body decreases, so that the productivity tends to be lowered. Moreover, when the average crystal grain size of zirconia is more than 0.5 μm, the mechanical properties tend to decrease. When the average crystal grain size of the oxides of iron, chromium and titanium is more than 2.0 μm, the crystal portion of the oxides of iron, chromium and titanium serves as a starting point of destruction, so that the mechanical properties tend to decrease.

In addition, the average crystal grain size of zirconia and the average crystal grain size of the oxides of iron, chromium and titanium can be obtained by the following measuring procedures. First, an arbitrary surface of zirconia sintered body is polished with a diamond abrasive grain so as to form a mirror surface, and then the surface is etched with phosphoric acid for about several 10 seconds. Next, an arbitrary portion is selected from the etched surface and an image of that portion of the surface is taken in a range of 5 μm by 8 μm at 3,750 to 5,000 magnifications. Then, the above image is subjected to an analysis using an image analysis software "Image-Pro Plus" (manufactured by Nihon Visual Science Inc.), thereby each of the average crystal grain size of zirconia and the average crystal grain size of oxides of iron, chromium and titanium can be obtained.

In addition, it is preferable that the zirconia sintered body of the present invention has a three point bending strength of 950 MPa or more. When the three point bending strength of the zirconia sintered body of the present invention is 950 MPa or more, the zirconia sintered body has high strength and can be used for a long period of time without causing not so many breakages. Accordingly, the zirconia sintered body of the present invention can be suitably applied to the jig and tool used in the production processes of the semiconductor manufacturing device, the magnetic head and the electronic parts, jigs to be used in the manufacturing processes or assembling processes thereof, guides for magnetic tapes and a separating claw used in image forming device and so on. Moreover, it is possible to accomplish downsizing and to make the wall thickness thinner than the conventional thickness, thereby attaining a weight saving according to the present invention. Thus, the zirconia sintered body of the present invention can be suitably applied to the vacuum nozzle and tweezers, each of which is required to have thinner wall thickness and lighter weight as well as to accomplish downsizing, which are accompanied by the progress of downsizing of the magnetic heads and the electronic parts which are works. In the meanwhile, the three point bending strength of the zirconia sintered body of the present invention can be measured based on JIS R 1601-1995.

In addition, it is preferable that the zirconia sintered body of the present invention has, a fracture toughness value of not less than 4 MPa·m$^{1/2}$. When the zirconia sintered body of the present invention has the fracture toughness value of not less than 4 MPa·m$^{1/2}$, it is possible to avoid formation of cracks during handling or contacting with the chip form electronic parts or the magnetic heads, which are works, in the product that are formed from the zirconia sintered body. Thus, the product can be used for a long period of time. In addition, the fracture toughness value of the zirconia sintered body of the present invention can be measured according to the single edge precracked beam method (SEPB method) prescribed by JIS R 1607-1995.

In order to stabilize the crystal phase of zirconia and to improve the mechanical properties thereof, such as the three point bending strength and the fracture toughness value, it is preferable that the zirconia sintered body contains a compound of yttrium (Y) as the stabilizer. As such compound of yttrium (Y), which stabilizes the crystal phase of zirconia and improves the mechanical properties thereof, there are yttrium oxide ($Y_2O_3$), yttrium nitrate hexahydrate ($Y(NO_3)_3 \cdot 6H_2O$), yttrium chloride hexahydrate ($YCl_3 \cdot 6H_2O$), yttrium acetate trihydrate ($Y(CH_3COO)_3 \cdot 3H_2O$) and so on. In addition, a compound of yttrium (Y) and aluminum (Al), which includes $YAlO_3$ (YAP), $Y_3Al_5O_{12}$ (YAG) and $Y_4Al_5O_9$ and so on, can also be used.

It is preferable that the zirconia sintered body of the present invention has a volume specific resistance value in the range from $10^5$ to $10^7$ ohm-cm. When the volume specific resistance value is in the range from $10^5$ to $10^7$ ohm-cm, there are few cases that the static electricity dissipates at once from the tweezers formed from the zirconia sintered body of the present invention, which handles the magnetic heads, thereby causing a spark and arising any failure in the apparatus and the magnetic heads as works. Moreover, in the vacuum nozzle that conveys the chip form electronic parts, which are the works, when the static electricity cannot dissipate easily from the work, conveying errors such as bringing-back phenomenon due to failing to release the parts tends to occur. Thus, using the work formed from the zirconia sintered body of the present invention enables to decrease the conveying errors such as bringing-back phenomenon, so that it can be suitably used for the application where the function of the static electricity dissipation is required. In addition, in order that the zirconia sintered body has the three point bending strength of not less than 950 MPa, the fracture toughness value of not less than 4 MPa·m$^{1/2}$ and the volume specific resistance value in the range from $10^5$ to $10^7$ ohm-cm, it is capable to prepare a composition comprising zirconia which contains a stabilizer in an amount of 66 to 80 parts by mass and the oxides of iron, chromium and titanium in an total amount of 20 to 34 parts by mass. The volume specific resistance value of the zirconia sintered body of the present invention can be measured according to JIS C2141-1992.

Moreover, it is preferable that the zirconia sintered body of the present invention has a voltage decay time in the range from 0.02 to 0.1 seconds. In this way, it is capable to dissipate the static electricity at an appropriate rate from the product which is formed from the zirconia sintered body of the present invention, for example, the tweezers or the vacuum nozzle. Thereby, the conveying time of the chip form electronic parts, which are the works, or the magnetic heads can be shortened, so that it is suitably used for the application where the function of the static electricity dissipation is required. In particular, when the present sintered body is used for the vacuum nozzle, which is a member of an electronic component mounting apparatus to be used for mounting the chip form electronic parts onto a circuit board, it is capable to respond to an improved mounting rate, which are the demands of the market, so that it is suitable. In the meanwhile, the voltage decay time of the zirconia sintered body of the present invention can be measured by the procedures as follows. According to IEC61340-5-1, a specimen having a prismatic body having a size of 3 mm by 4 mm by 50 mm is cut out. One end of the specimen is contacted with a plate (CHARGED PLATE MONITOR Model H0601, manufactured by Shishido Electrostatic, Ltd.) having an electrostatic capacitance of 20 pF after being charged at a voltage of 1000V. Then, grounding another end of the specimen by contacting it with a metal, the time necessary to decreases the voltage from 1000 V to 100 V is measured by a high frequency oscilloscope (DL1620 200 MHz Oscilloscope, manufactured by YOKOGAWA ELECTRIC Corp.).

In addition, in the vacuum nozzle, which is a member of the electronic component mounting apparatus to be used for mounting the chip form electronic parts onto a circuit board, it sometimes causes an erroneous image recognition by a CCD camera of the apparatus due to the color tones of the parts. In this context, the color tone is denoted by the lightness index L* and the chromaticness indices a* and b* of the surface of the parts in CIE1976 L*a*b* color space.

Here, the lightness index L* is an index which shows the contrast in color tone. When the value of the lightness index L* is large, the color tone is bright and when the value of the lightness index L* is small, the color tone is dark. Then, the chromaticness index a* represents the chromaticity on the green-red chromatic coordinate. When the value of the chromaticness index a* is large in plus direction, the color tone turns to reddish, wherein the smaller absolute value makes the color tone less brilliant. And when the value of the chromaticness index a* is large in minus direction, the color tone turns to greenish. Furthermore, the chromaticness index b* represents the chromaticity on the yellow-blue chromatic coordinate. When the value of the chromaticness index b* is large in plus direction, the color tone turns to yellowish, wherein the smaller absolute value makes the color tone less brilliant. And when the value of the chromaticness index b* is large in minus direction, the color tone turns to bluish.

When the surface of the zirconia sintered body of the present invention has the values of the lightness index L* not more than 10, the chromaticness index a* not less than 0 nor more than 2, and the chromaticness index b* not less than −2 nor more than 0 in color space of CIE1976 L*a*b* of a surface, it is capable to represent a color tone similar to onyx black, wherein the brilliance could be turned down. For example, when the zirconia sintered body of the present invention having the color tone within the above range is used for the vacuum nozzle, which is a member of the electronic component mounting apparatus to be used for mounting the chip form electronic parts onto a circuit board, the color tone thereof can be differed from that of the chip form electronic parts. Thus, it is capable to decrease to cause the erroneous image recognition by the CCD camera, so that lowering of the operation rate of the electronic component mounting apparatus can be avoided.

In addition, the value of the lightness index L* can be set to not more than 5 by preparing the composition comprising zirconia which contains a stabilizer in an amount of 66 to 70 parts by mass and the oxides of iron, chromium and titanium in an total amount of 30 to 34 parts by mass. Thus, it is suitable that the difference of the color tone of the product from that of the chip form electronic parts can be clarified.

In addition, each of the values of the lightness index L* and the chromaticness indices a* and b* in the color space of CIE1976 L*a*b* of the surface thereof can be obtained by a measurement according to JIS Z 8722-2000. For example, the measurement can be performed by a color-difference meter CR-221 (manufactured by former Minolta Co., Ltd.) with using a standard light source of D65 under a light receiving condition a ((45-n) [45-0]) and the diameter of measurement at 3 mm. In the case where a sufficient diameter of measurement can not be available, the measurement can be performed under the above mentioned conditions after carrying out polishing work of the arbitrary portion.

Moreover, the zirconia sintered body of the present invention comprises the zirconia containing the stabilizer of an yttrium compound in the proportion of 3 to 35% by mass based on the zirconia containing the stabilizer and the zirconia containing the stabilizer of a cerium compound in the proportion of 65 to 97% by mass based on the zirconia containing the stabilizer. Thus, although the reason is not clear, it is capable to represent a color tone further close to onyx black, while the brilliance being turned down. Therefore, when the zirconia sintered body of the present invention is used for the vacuum nozzle, which is a member of the electronic component mounting apparatus to be used for mounting the chip form electronic parts onto a circuit board, the difference of the color tone thereof from the chip form electronic parts becomes clear. Thus, it is capable to decrease to cause the erroneous image recognition by the CCD camera, so that lowering of the operation rate of the electronic component mounting apparatus can be avoided.

When the zirconia sintered body of the present invention, which comprises the zirconia containing the stabilizer of the yttrium compound in the proportion of 3 to 35% by mass and the zirconia containing the stabilizer of the cerium compound in the proportion of 65 to 97% by mass each based on the zirconia containing the stabilizer, respectively, is used for the jig used in the production process or the assembling process of the workpiece, and after a cycle comprising the workpiece being worked in the condition where the workpiece is adhered with the jig with an adhesive such as a wax, being heated at a temperature around 100° C. together with the jig to melt the adhesive, and thereafter the workpiece being removed has been repeated, although the reason is not clear, the surface of the zirconia sintered body is capable to have deterioration resistance to the heat, since the phase transition due to the heat from the tetragonal or cubic crystal phase to the monoclinic crystal phase is suppressed by the zirconia crystal on the surface of the zirconia sintered body. In addition, the zirconia sintered body can be suitably used under the circumstance where heat is repeatedly applied for a long period of time.

In order to obtain the above mentioned properties, it is preferable to use the stabilizer of the yttrium compound in an amount of 1 to 3% by mol and the stabilizer of the cerium compound in an amount of 8 to 12% by mol. As the compound of yttrium (Y), there are yttrium oxide ($Y_2O_3$), yttrium nitrate hexahydrate ($Y(NO_3)_3.6H_2O$), yttrium chloride hexahydrate ($YCl_3.6H_2O$), yttrium acetate trihydrate ($Y(CH_3COO)_3.3H_2O$) and so on. As the compound of cerium (Ce), there are cerium oxide ($CeO_2$), cerium acetate ($Ce(C2H3O_2)_3.nH_2O$), cerium hydroxide ($Ce(OH)_4.nH_2O$), cerium chloride ($CeCl_3.nH_2O$), cerium sulfate ($Ce(SO_4)_2$) and so on.

Among the zirconia containing the stabilizer, each proportion of the zirconia containing the stabilizer of the yttrium compound and the zirconia containing the stabilizer of the cerium compound was determined by analyzing through the Rietveld method using the data of X-ray diffraction (XRD) measurement of porcelain. With regard to the Rietveld method, the method described in "Handbook of Crystal Analysis" edited by the Crystallographic Society of Japan, Handbook of Crystal Analysis Editing Committee and published by Kyoritsu Shuppan Co., Ltd., Sep. 1999, pp. 492-499 is used. Specifically, RIETAN-2000 program is applied to the X-ray diffraction pattern of 2 theta ranging from 10 degrees to 130 degrees, in which the specimen to be evaluated was measured by the diffractometer method, thereby each proportion of the zirconia stabilized by the yttrium compound and the zirconia stabilized by the cerium compound is obtained.

Next, the production method of the zirconia sintered body of the present invention will be explained.

The method of manufacturing the zirconia sintered body of the present invention comprises the step of weighing 66 to 90 parts by mass of the zirconia powder which has an average particle diameter of from 0.3 to 1.0 μm and contains the stabilizer of the yttrium compound in an amount of 1 to 3% by mol, after being added with a solvent, pulverizing the zirconia powder so as to have an average crystal grain size in the range from 0.2 to 0.5 μm, thereby obtaining a first slurry. In the meanwhile, the zirconia powder which was prepared through a coprecipitation process by adding the stabilizer can also be used. Moreover, HfO2, which is contained as an inevitable impurity in zirconia, is interpreted that it is included in zirconia, and the zirconia powder containing the stabilizer refers to the matter in which the stabilizer is mixed or the matter which has preliminarily been stabilized through the coprecipitation method.

In order to bring the color tone of the zirconia sintered body further close to onyx black after sintering and to avoid that the zirconia crystal on the surface of the zirconia sintered body to transfer to the monoclinic phase from the tetragonal and the cubic phases and also to avoid that the mechanical properties thereof decreases due to being heated, it is necessary to weigh the zirconia powder containing the stabilizer of the yttrium compound and the zirconia powder containing the stabilizer of the cerium compound so that the proportion of the former to the latter satisfies a ratio of 3:65 to 35:97 based on weight.

Next, each of oxides of iron having an average particle diameter of from 0.3 to 2.0 μm, oxides of chromium having an average particle diameter of from 0.4 to 2.0 μm and oxides of titanium having an average particle diameter of from 0.3 to 1.0 μm is supplied. The oxides of iron, chromium and titanium are weighed so that among the oxides of iron, chromium and titanium, the proportion of oxides of iron is 70 to 99.5% by mass, the proportion of oxides of chromium is 0.4 to 20% by mass, the proportion of oxides of titanium is 0.1 to 10% by mass and the weight of the oxides of iron, chromium and titanium is 10 to 34 parts by mass in total. Then, after adding a solvent, the oxides are pulverized using a ball mill or a bead mill and so on to obtain an average particle diameter of 0.1 to 0.5 μm, which is referred to as a second slurry. Although an example in which the oxides of iron, chromium and titanium are used is described here, it is also possible to use a powder of hydroxide or carbonate, which is capable to change to the oxides of iron, chromium and titanium during sintering.

In the meanwhile, it is important to use the balls or the beads in the mill, which will not affect the mechanical properties, semi-conductivity and the color tone of the zirconia sintered body due to being worn. For example, with regard to the balls, it is preferable to use the ceramics balls having a blackish color and is also preferable that the ceramic has a composition the same as or close to that of the zirconia sintered body.

Moreover, it is capable to make the crystal grain diameter of the zirconia sintered body smaller as the average particle diameter after pulverized is smaller. However, when it is intended to make the average particle diameter of the zirconia sintered body less than 0.2 μm and make the average particle diameter of the oxides of iron, chromium and titanium less than 0.1 μm, there arises problems in that the pulverization time lengthens, the production cost could increase and the balls or beads which are used in the mill could be worn, which could be incorporated into the balls or beads, thereby causing a change in the properties thereof.

Then, the first slurry is mixed with the second slurry and, after adding various binders thereto in each of predetermined amount, the mixed slurry is dried by being subjected to a spray drying process to obtain granular particles. Thereafter, the above granular particles are formed in a green compact having a desired shape such as disk, plate, ring and so on by being subjected to a desired molding process, for example, the dry pressure molding process, the cold hydrostatic pressure molding process and so on.

Then, the green compact thus obtained is subjected to a sintering process at a temperature range from 1300 to 1450° C. for 1 to 3 hours under the atmospheric air condition to obtain a zirconia sintered body of the present invention. The reason why the sintering temperature was set to the range from 1300° C. to 1450° C. is as follows. When the sintering temperature is less than 1300° C., a densified sintered body can not be obtained. On the other hand, when the sintering temperature is more than 1450° C., the crystal grain diameter increases excessively due to the grain growth. Thus, both cases have a tendency to deteriorate the mechanical properties of the zirconia sintered body. There arises a possibility that $Al_2O_3$, $MnO_2$, $SiO_2$, $Na_2O$, $CaO$ and so on can be incorporated as impurities in the powders of the raw materials or during the manufacturing process. However, these materials may be incorporated therein in an amount of not more than 2.0% by mass.

The zirconia sintered body of the present invention manufactured by the production method of the present invention, wherein the zirconia powder has an average particle diameter of from 0.3 to 0.5 μm and the oxides of iron, chromium and titanium have an average particle diameter of from 0.5 to 2.0 μm, can provide a densified zirconia sintered body having an excellent mechanical properties without sintering under vacuum or reducing atmosphere or performing the HIP treatment after sintering under an atmospheric air condition which were conventionally performed for the purpose of improving the mechanical properties. Thus, the apparatus for performing HIP treatment or of sintering process under vacuum or reducing atmosphere can be omitted, so that the production cost can be reduced. However, it is possible to subject the thus obtained product to further sintering process under vacuum or reducing atmosphere or to the HIP treatment for the purpose of further improving the mechanical properties.

The zirconia sintered body of the present invention manufactured by the production method of the present invention has so excellent mechanical properties by having a three point bending strength of not less than 950 MPa and a fracture toughness value of not less than 4 MPa·m$^{1/2}$. Thus, when a product such as a vacuum nozzle or tweezers is formed from the zirconia sintered body of the present invention, it is capable to provide the product having a lighter weight by forming a thinner wall thickness and a smaller size rather than the conventional products. In addition, it is possible to avoid formation of cracks during handling or contacting with the chip form electronic parts or the magnetic heads, which are works. Furthermore, since the zirconia sintered body of the present invention has the semi-conductivity as it shows the volume specific resistance value in the range from $10^5$ to $10^8$ ohm-cm, it is suitable used for the applications where the function of the static electricity dissipation is required.

Therefore, when the zirconia sintered body of the present invention is used in the applications such as a vacuum nozzle that is a member of an electronic parts mounting apparatus used for mounting electronic parts in chip form onto a circuit substrate, tweezers for handling magnetic heads, jig and tool used in the production processes of the semiconductor manufacturing device, the magnetic head and the electronic parts, jigs to be used in the manufacturing processes or assembling processes thereof, guides for magnetic tapes and a separating claw used in image forming device and so forth, such products can be suitable used for a long period of time due to the excellent mechanical properties and the semi-conductivity.

EXAMPLES

Hereinafter, examples of the present invention will be specifically explained. However, the present invention is not limited to these examples.

Example 1

First, as the raw materials, each of the zirconia powder having an average particle diameter of 0.7 μm and contains $Y_2O_3$ as the stabilizer in an amount of 2% by mol, the iron powder having an average particle diameter of 1.1 μm, the chromium powder having an average particle diameter of 0.7 μm and the titanium powder having an average particle diameter of 0.6 μm was supplied and weighed so as to form each composition as shown in Tables 1 and 2. Then, the zirconia powder and each of the powders of the oxides of iron, chromium and titanium, to which water as the solvent was added, respectively, were introduced into a ball mill and pulverized to obtain the first slurry. The powders of the oxides of iron, chromium and titanium were separately pulverized to obtain the second slurry.

Then, the first slurry and the second slurry were mixed with each other, and the resulting mixture was dried after being added with a binder by spray drying with a spray dryer to obtain a granular particles. Then, the granular particles were filled in a molding die and formed into a compact having a desired form through the dry pressure molding process. After subjecting to the sintering process by holding the compact at a temperature of 1350° C. under the atmospheric air condition for two hours, each of the zirconia sintered body each referred to as Sample Nos. 1 to 49 was obtained, respectively.

Then, each zirconia sintered body of Samples Nos. 1 to 49 was subjected to ICP emission spectrochemical analysis relating to each composition and each content of iron, chromium and titanium is measured, which was converted into oxide. In addition, the value of parts by mass of the zirconia was obtained by subtracting each parts by mass of the oxides of iron, chromium and titanium from 100 parts by mass.

Moreover, the proportion of the tetragonal phase and the cubic phase of the zirconia crystal phase on the mirror polished surface of the zirconia sintered body was checked. The mirror polished surface of the zirconia sintered body was subjected to the X-ray diffraction measurement and the above proportion was calculated according to the following formula using the obtained reflection peak intensity on (111) plane and (11-1) plane of the monoclinic crystal phase and the reflection peak intensity on (111) plane of the tetragonal and cubic crystal phases in the zirconia crystal phase.

$$(It(111)+Ic(111))/(Im(111)+Im(11\text{-}1)+It(111)+Ic(111))*100$$

In addition, in order to check the workability of the zirconia sintered body, the proportion of the monoclinic crystal phase in the surface of the zirconia sintered body was checked. The surface of the zirconia sintered body was subjected to the X-ray diffraction measurement and the proportion was obtained according to the following formula.

(Im(111)+Im(11-1))/(Im(111)+Im(11-1)+It(111)+Ic(111))*100

Then, the average particle diameter of the zirconia sintered body was obtained according to the following procedure. First, an arbitrary surface of the zirconia sintered body was polished with diamond abrasive grains, thereafter this surface was subjected to an etching process with phosphoric acid for about several 10 seconds. Then, an arbitrary portion on the etched surface was selected and a picture of that portion was taken with a scanning electron microscope (SEM), thereby an image of the range of 5 μm by 8 μm at 5000 times magnification was obtained. Then, the image was analyzed using an image analyzing software "Image Pro Plus" (manufactured by Nihon Visual Science Co. ltd,), thereby the average particle diameter of the zirconia as well as each average particle diameter of the oxides of iron, the oxides of chromium and the oxides of titanium were obtained.

In addition, the three point bending strength was measured according to JIS R1601-1995 and the fracture toughness value of the zirconia sintered body was measured according to the single edge precracked beam method (SEPB method) prescribed by JIS R 1607-1995, respectively. Moreover, the volume specific resistance value was measured as an electrical property according to JIS C 2141-1992.

In addition, the voltage decay time of the zirconia sintered body of the present invention was measured by the procedures as follows. According to IEC61340-5-1, a specimen having a prismatic body having a size of 3 mm×4 mm×50 mm was cut out. One end of the specimen was contacted with a plate (CHARGED PLATE MONITOR Model H0601, manufactured by Shishido Electrostatic, Ltd.) having an electrostatic capacitance of 20 pF after being charged at a voltage of 1000V. Then, grounding another end of the specimen by contacting it with a metal, the time necessary to decreases the voltage from 1000 V to 100 V was measured by a high frequency oscilloscope (DL1620 200 MHz Oscilloscope, manufactured by YOKOGAWA ELECTRIC Corp.).

In addition, each value of the lightness index L* and the chromaticness indices a* and b* in the color space of CIE1976 L*a*b* of the surface was measured according to JIS Z 8722-2000. The measurement was performed by a color-difference meter CR-221 (manufactured by former Minolta Co., Ltd.) with using a CIE standard light source of D65 under a light receiving condition a ((45-n) [45-0]) and the diameter of measurement at 3 mm. With regard to each result, the composition and the crystal phase of the zirconia are shown in Tables 1 and 2, and the average particle diameters and the values of the properties are shown in Tables 3 and 4.

TABLE 1

| No. | zirconia (parts by mass) | oxides of iron (parts by mass) | oxides of chromium (parts by mass) | oxides of titanium (parts by mass) | proportion of oxides of iron (% by mass) | proportion of oxides of chromium (% by mass) | proportion of oxides of titanium (% by mass) | proportion of tetragonal and cubic crystal phases (%) | proportion of the monoclinic crystal phase in the surface (%) |
|---|---|---|---|---|---|---|---|---|---|
| *1 | 95 | 5 | 0 | 0 | 100 | 0 | 0 | 100 | 9 |
| *2 | 95 | 4.985 | 0.015 | 0 | 99.7 | 0.3 | 0 | 98 | 9 |
| *3 | 95 | 4.975 | 0.025 | 0 | 99.5 | 0.5 | 0 | 98 | 3 |
| *4 | 95 | 4.975 | 0.02 | 0.005 | 99.5 | 0.4 | 0.1 | 98 | 2 |
| *5 | 95 | 4.975 | 0.02 | 0.05 | 98.6 | 0.4 | 1 | 99 | 2 |
| *6 | 95 | 3.5 | 1 | 0.5 | 70 | 20 | 10 | 97 | 2 |
| *7 | 95 | 2.5 | 1.5 | 1 | 50 | 30 | 20 | 97 | 4 |
| *8 | 95 | 3 | 1 | 1 | 60 | 20 | 20 | 98 | 3 |
| *9 | 90 | 10 | 0 | 0 | 100 | 0 | 0 | 99 | 12 |
| *10 | 90 | 9.97 | 0.03 | 0 | 99.7 | 0.3 | 0 | 99 | 10 |
| *11 | 90 | 9.95 | 0.05 | 0 | 99.5 | 0.5 | 0 | 98 | 11 |
| 12 | 90 | 9.95 | 0.04 | 0.01 | 99.5 | 0.4 | 0.1 | 98 | 1 |
| 13 | 90 | 9 | 0.8 | 0.2 | 90 | 8 | 2 | 98 | 1 |
| 14 | 90 | 9 | 0.2 | 0.8 | 90 | 2 | 8 | 98 | 1 |
| 15 | 90 | 8.5 | 1.4 | 0.1 | 85 | 14 | 1 | 98 | 2 |
| 16 | 90 | 8 | 1.5 | 0.5 | 80 | 15 | 5 | 98 | 1 |
| 17 | 90 | 7 | 2 | 1 | 70 | 20 | 10 | 98 | 1 |
| *18 | 90 | 5 | 3 | 2 | 50 | 30 | 20 | 92 | 7 |
| *19 | 90 | 6 | 2 | 2 | 60 | 0 | 20 | 98 | 3 |
| 20 | 19.9 | 19.9 | 0.08 | 0.02 | 99.5 | 0.4 | 0.1 | 98 | 3 |
| 21 | 18.8 | 18.8 | 0.2 | 1 | 94 | 1 | 5 | 98 | 2 |
| 22 | 18 | 18 | 1.8 | 0.2 | 90 | 9 | 1 | 98 | 2 |
| 23 | 16 | 16 | 2 | 2 | 80 | 10 | 10 | 98 | 2 |
| 24 | 14 | 14 | 4 | 2 | 70 | 20 | 10 | 98 | 3 |

*outside the scope of the present invention

TABLE 2

| No. | zirconia (parts by mass) | oxides of iron (parts by mass) | oxides of chromium (parts by mass) | oxides of titanium (parts by mass) | proportion of oxides of iron (% by mass) | proportion of oxides of chromium (% by mass) | proportion of oxides of titanium (% by mass) | proportion of tetragonal and cubic crystal phases (%) | proportion of the monoclinic crystal phase in the surface (%) |
|---|---|---|---|---|---|---|---|---|---|
| *25 | 70 | 30 | 0 | 0 | 100 | 0 | 0 | 98 | 13 |
| *26 | 70 | 29.91 | 0.06 | 0.03 | 99.7 | 0.2 | 0.1 | 97 | 11 |
| *27 | 70 | 27 | 3 | 0 | 90 | 10 | 0 | 98 | 20 |
| 28 | 70 | 29.85 | 0.12 | 0.03 | 99.5 | 0.4 | 0.1 | 98 | 5 |

TABLE 2-continued

| | composition | | | | | | crystal phase of zirconia | |
|---|---|---|---|---|---|---|---|---|
| No. | zirconia (parts by mass) | oxides of iron (parts by mass) | oxides of chromium (parts by mass) | oxides of titanium (parts by mass) | proportion of oxides of iron (% by mass) | proportion of oxides of chromium (% by mass) | proportion of oxides of titanium (% by mass) | proportion of tetragonal and cubic crystal phases (%) | proportion of the monoclinic crystal phase in the surface (%) |
| 29 | 70 | 28.2 | 0.3 | 1.5 | 94 | 1 | 5 | 98 | 3 |
| 30 | 70 | 27 | 2.4 | 0.6 | 90 | 8 | 2 | 97 | 4 |
| 31 | 70 | 28 | 3 | 1 | 86.7 | 10 | 3.3 | 98 | 4 |
| 32 | 70 | 25.5 | 1.5 | 3 | 85 | 5 | 10 | 98 | 3 |
| 33 | 70 | 24 | 5.7 | 0.3 | 80 | 19 | 1 | 96 | 5 |
| 34 | 70 | 21 | 6 | 3 | 70 | 20 | 10 | 93 | 6 |
| *35 | 70 | 15 | 9 | 6 | 50 | 30 | 20 | 90 | 19 |
| *36 | 70 | 18 | 6 | 6 | 60 | 20 | 20 | 88 | 15 |
| *37 | 66 | 33.83 | 0 | 0.17 | 99.5 | 0 | 0.5 | 89 | 25 |
| 38 | 66 | 33.93 | 0.14 | 0.03 | 99.5 | 0.4 | 0.1 | 94 | 5 |
| 39 | 66 | 25.5 | 3.4 | 3.4 | 80 | 10 | 10 | 92 | 6 |
| 40 | 66 | 23.8 | 6.8 | 3.4 | 70 | 20 | 10 | 91 | 8 |
| *41 | 66 | 22.1 | 8.5 | 3.4 | 65 | 25 | 10 | 85 | 10 |
| *42 | 65 | 35 | 0 | 0 | 100 | 0 | 0 | 85 | 31 |
| *43 | 65 | 34.895 | 0.105 | 0 | 99.7 | 0.3 | 0 | 87 | 28 |
| *44 | 65 | 34.825 | 0.175 | 0 | 99.5 | 0.5 | 0 | 87 | 26 |
| *45 | 65 | 34.825 | 0.14 | 0.035 | 99.5 | 0.4 | 0.1 | 86 | 19 |
| *46 | 65 | 34.51 | 0.14 | 0.35 | 98.6 | 0.4 | 1 | 85 | 18 |
| *47 | 65 | 24.5 | 7 | 3.5 | 70 | 20 | 10 | 85 | 16 |
| *48 | 65 | 17.5 | 10.5 | 7 | 50 | 30 | 20 | 80 | 22 |
| *49 | 65 | 21 | 7 | 7 | 60 | 20 | 20 | 82 | 21 |

*outside the scope of the present invention

TABLE 3

| | average crystal grain diameter | | properties | | | | | chromaticness indices | |
|---|---|---|---|---|---|---|---|---|---|
| No. | zirconia (μm) | oxides of iron, chromium and titanium (μm) | three point bending strength (MPa) | fracture toughness value (MPa·m$^{1/2}$) | volume specific resistance value (ohm-cm) | voltage decay time (sec) | lightness index L* | a* | b* |
| *1 | 0.5 | 2.6 | 1170 | 3.7 | $\geq 10^9$ | >2 | 14 | 4.3 | 3.5 |
| *2 | 0.5 | 2.4 | 1146 | 3.8 | $\geq 10^9$ | >2 | 14 | 2.9 | 2.8 |
| *3 | 0.5 | 2.4 | 1140 | 3.8 | $\geq 10^9$ | >2 | 13 | 2.8 | 2.8 |
| *4 | 0.5 | 2.2 | 1119 | 3.9 | $\geq 10^9$ | >2 | 13 | 2.4 | 2.5 |
| *5 | 0.5 | 2.1 | 1157 | 3.9 | $\geq 10^9$ | >2 | 13 | 2.4 | 2.5 |
| *6 | 0.4 | 2.1 | 1162 | 3.9 | $\geq 10^9$ | >2 | 11 | 2.0 | 2.3 |
| *7 | 0.6 | 2.0 | 942 | 3.9 | $\geq 10^9$ | >2 | 11 | 1.5 | 2.2 |
| *8 | 0.6 | 2.0 | 938 | 3.9 | $\geq 10^9$ | >2 | 11 | 1.4 | 2.2 |
| *9 | 0.6 | 2.4 | 1100 | 3.7 | $5.6*10^8$ | 1.2 | 12 | 3.5 | 2.4 |
| *10 | 0.5 | 2.2 | 1106 | 4.5 | $5.1*10^8$ | 1.2 | 10 | 1.9 | −0.5 |
| *11 | 0.5 | 2.1 | 945 | 3.9 | $4.7*10^8$ | 1.1 | 10 | 1.6 | −0.4 |
| 12 | 0.4 | 1.4 | 1142 | 4.5 | $2.9*10^8$ | 1.02 | 9 | 1.5 | −0.4 |
| 13 | 0.4 | 0.5 | 1125 | 4.5 | $1.9*10^8$ | 0.78 | 8 | 0.9 | −0.3 |
| 14 | 0.3 | 0.6 | 1114 | 4.5 | $1.4*10^8$ | 0.74 | 8 | 0.9 | −0.3 |
| 15 | 0.4 | 12 | 1139 | 4.5 | $2.7*10^8$ | 0.96 | 9 | 1.3 | −0.3 |
| 16 | 0.4 | 0.8 | 1126 | 4.5 | $2.0*10^8$ | 0.8 | 9 | 1.0 | −0.2 |
| 17 | 0.3 | 0.9 | 1113 | 4.6 | $1.1*10^8$ | 0.72 | 8 | 0.8 | −0.3 |
| *18 | 0.6 | 0.8 | 942 | 3.9 | $\geq 10^9$ | >2 | 7 | 0.5 | −1.4 |
| *19 | 0.6 | 0.8 | 945 | 3.9 | $\geq 10^9$ | >2 | 8 | 0.6 | −1.2 |
| 20 | 0.4 | 1.1 | 1077 | 4.5 | $9.2*10^7$ | 0.54 | 7 | 0.9 | −0.6 |
| 21 | 0.4 | 0.7 | 1066 | 4.6 | $5.5*10^7$ | 0.24 | 6 | 0.8 | −1.2 |
| 22 | 0.4 | 1.0 | 1075 | 4.5 | $7.2*10^7$ | 0.48 | 6 | 0.8 | −1.1 |
| 23 | 0.4 | 0.9 | 1086 | 4.5 | $1.1*10^8$ | 0.72 | 7 | 1.2 | −0.8 |
| 24 | 0.3 | 0.8 | 1055 | 4.6 | $4.2*10^7$ | 0.14 | 6 | 0.7 | −1.6 |

*outside the scope of the present invention

TABLE 4

| No. | average crystal grain diameter | | properties | | | | | chromaticness indices | |
|---|---|---|---|---|---|---|---|---|---|
| | zirconia (μm) | oxides of iron, chromium and titanium (μm) | three point bending strength (MPa) | fracture toughness value (MPa·m$^{1/2}$) | volume specific resistance value (ohm-cm) | voltage decay time (sec) | lightness index L* | a* | b* |
| *25 | 0.5 | 4.0 | 809 | 3.7 | 8.4*10$^7$ | 0.28 | 6 | 3.1 | 1.2 |
| *26 | 0.5 | 3.0 | 825 | 3.8 | 7.3*10$^7$ | 0.26 | 5 | 1.8 | −0.6 |
| *27 | 0.5 | 2.1 | 938 | 3.9 | 3.1*10$^5$ | 0.04 | 5 | 0.8 | −1.1 |
| 28 | 0.5 | 1.6 | 999 | 4.3 | 1.9*10$^5$ | 0.04 | 5 | 1.0 | −0.7 |
| 29 | 0.5 | 1.4 | 968 | 4.3 | 5.7*10$^5$ | 0.06 | 4 | 0.6 | −0.9 |
| 30 | 0.5 | 1.1 | 980 | 4.3 | 5.7*10$^5$ | 0.04 | 4 | 0.5 | −1.5 |
| 31 | 0.5 | 1.2 | 986 | 4.3 | 5.7*10$^5$ | 0.06 | 4 | 0.7 | −1.0 |
| 32 | 0.5 | 1.2 | 982 | 4.3 | 5.7*10$^5$ | 0.04 | 4 | 0.6 | −1.3 |
| 33 | 0.4 | 1.1 | 975 | 4.2 | 5.7*10$^5$ | 0.04 | 3 | 0.5 | −1.7 |
| 34 | 0.4 | 1.0 | 978 | 4.2 | 5.7*10$^5$ | 0.03 | 3 | 0.5 | −1.8 |
| *35 | 0.7 | 0.9 | 905 | 3.8 | 9.1*10$^4$ | <0.02 | 4 | 0.5 | −0.3 |
| *36 | 0.7 | 0.9 | 879 | 3.8 | 8.4*10$^4$ | <0.02 | 4 | 0.4 | −0.3 |
| *37 | 0.7 | 3.5 | 835 | 3.9 | 9.2*10$^4$ | <0.02 | 4 | 0.9 | −1.0 |
| 38 | 0.5 | 1.6 | 968 | 4.2 | 4.5*10$^5$ | 0.05 | 5 | 0.8 | −1.1 |
| 39 | 0.5 | 1.2 | 961 | 4.1 | 3.1*10$^5$ | 0.03 | 4 | 0.6 | −1.8 |
| 40 | 0.5 | 0.8 | 952 | 4.0 | 1.8*10$^5$ | 0.03 | 4 | 0.5 | −2.0 |
| *41 | 0.6 | 4.5 | 810 | 3.7 | 7.8*10$^4$ | <0.02 | 4 | 0.4 | 0.1 |
| *42 | 0.7 | 6.0 | 723 | 3.5 | 7.6*10$^4$ | <0.02 | 5 | 2.5 | 0.3 |
| *43 | 0.6 | 5.0 | 736 | 3.6 | 5.8*10$^4$ | <0.02 | 4 | 1.2 | −0.6 |
| *44 | 0.6 | 5.0 | 740 | 3.5 | 3.4*10$^4$ | <0.02 | 4 | 0.5 | 0 |
| *45 | 0.6 | 4.0 | 744 | 3.5 | 3.1*10$^4$ | <0.02 | 4 | 0.2 | −0.4 |
| *46 | 0.6 | 4.0 | 749 | 3.6 | 2.7*10$^4$ | <0.02 | 4 | 0.1 | −0.7 |
| *47 | 0.6 | 3.0 | 730 | 3.4 | 7.2*10$^6$ | 0.14 | 4 | −0.1 | 0.3 |
| *48 | 0.8 | 3.0 | 680 | 3.3 | 8.8*10$^4$ | <0.02 | 5 | −0.1 | 0.3 |
| *49 | 0.6 | 3.0 | 677 | 3.4 | 8.0*10$^4$ | <0.02 | 5 | −0.2 | 0.4 |

*outside the scope of the present invention

As shown in Tables 1 to 4, Samples Nos. 1 to 8 having 95 parts by mass of zirconia showed the volume specific resistance value not less than 10$^9$ ohm-cm, so that they were found to be difficult to be used for the products, to which the semi-conductivity is required. In addition, Samples Nos. 42 to 49 having 65 parts by mass of zirconia showed the value of three point bending strength less than 800 MPa due to having less content of zirconia.

Even in the specimens which had the content of the zirconia containing the stabilizer from 66 to 90 parts by mass and the content of the oxides of iron, chromium and titanium in total from 10 to 34 parts by mass, Samples Nos. 9 to 11, 25 and 27, each of which had the proportion of oxides of titanium to the oxides of iron, chromium and titanium less than 0.1% by mass were found that the proportion of monoclinic crystal phase in the surface of the zirconia sintered body was so high that the surface had less workability. Furthermore, each of Samples Nos. 25 and 27, which had a higher proportion of an oxides of iron but had a proportion of oxides of titanium less than 0.1% by mass, failed to control the grain growth of the oxides of iron during sintering, so that it had three point bending strength less than 950 MPa. Moreover, each of Samples Nos. 25, 26 and 37 had the proportion of oxides of chromium less than 0.4% by mass, so that it failed to control the grain growth of the oxides of iron. Consequently, it had less mechanical properties rather than Samples Nos. 27 and 38 each of which had the similar composition.

With regard to Samples Nos. 18 and 19, each of which had the proportion of oxides of iron among the oxides of iron, chromium and titanium less than 70% by mass, the volume specific resistance value not less than 10$^9$ ohm-cm and the voltage decay time more than two seconds, it was found to be difficult for those samples to be used for the application in which the semi-conductivity and the static electricity dissipation was required. Samples Nos. 35 and 36, each of which had the proportion of oxides of iron among the oxides of iron, chromium and titanium less than 70% by mass and had the proportion of oxides of titanium more than 10% by mass, had a larger average particle diameters due to the grain growth of the zirconia, so that the mechanical properties thereof had decreased. In addition, Sample No. 41 had the proportion of the oxides of chromium more than 20% by mass, so that the zirconia sintered body product had worse degree of sintering. Thus, a densified zirconia sintered body could not be formed and the mechanical properties thereof had decreased.

On the other hand, with regard to Samples Nos. 12 to 17, 20 to 24, 28 to 34 and 38 to 40, each of which comprised a zirconia that contained a stabilizer in the range from 66 to 90 parts by mass and oxides of iron, chromium and titanium in total in the range from 10 to 34 parts by mass, wherein among the oxides of iron, chromium and titanium, the proportion of oxides of iron was in the range from 70 to 99.5% by mass, the proportion of oxides of chromium was in the range from 0.4 to 20% by mass and the proportion of oxides of titanium was in the range from 0.1 to 10% by mass, wherein the combined proportion of tetragonal and cubic crystal phases in the zirconia crystal phase was not less than 90%, and wherein the zirconia sintered body had an average crystal grain size of from 0.3 to 0.5 μm and the oxides of iron, chromium and titanium had an average crystal grain size of from 0.5 to 2.0 μm, it had been found that each of them had the three point bending strength not less than 950 MPa and the fracture toughness value not less than 4 MPa·m$^{1/2}$, thereby it had an excellent mechanical properties.

Moreover, they had the volume specific resistance value in the range from 10$^5$ to 10$^8$ ohm-cm and the voltage decay time in the range from 0.02 to 2 seconds. Furthermore, they had the values of the lightness index L* not more than 10, the chromaticness index a* not less than 0 nor more than 2, and the chromaticness index b* not less than −2 nor more than 0 in the color space of CIE1976 L*a*b* of the surface thereof.

In addition, with regard to Samples Nos. 20 to 24, 28 to 34 and 38 to 40, each of which comprised 66 to 80 parts by mass of zirconia that contained a stabilizer and 20 to 34 parts by mass of oxides of iron, chromium and titanium in total, it had been found that each of them had the volume specific resistance value in the range from $10^5$ to $10^7$ ohm-cm, so that they were suitable to be used for the applications in which the function of the static electricity dissipation was required. Furthermore, with regard to Samples Nos. 28 to 34 and 38 to 40, each of which comprised the voltage decay time in the range from 0.02 to 1 seconds, it was found that, when they were used for the vacuum nozzle, which was a member of the electronic component mounting apparatus to be used for mounting the chip form electronic parts onto a circuit board, the nozzle could sufficiently satisfy the demands of the market. Moreover, it was found that the difference of the color tone as the electronic parts in chip form became clear and the frequency of causing erroneous image recognition by the CCD camera was decreased, as a result, lowering of the operation rate of the electronic component mounting apparatus could be avoided, since they had the values of the lightness index L* not more than 5 in color space of CIE1976 L*a*b* of the surface thereof.

Example 2

Then, as the zirconia powder, each of the zirconia powder described in Example 1 which had an average particle diameter of 0.7 μm and which contained $Y_2O_3$ in an amount of 2% by mol, a zirconia powder having an average particle diameter of 0.7 μm and the $CeO_2$ (cerium oxide) powder having an average particle diameter of 1 μm was prepared. Then, they were weighed so that each of Samples satisfied each proportion of the zirconia containing the stabilizer of the yttrium compound (shown as "Y—Zr" in Table 5) and the zirconia containing the stabilizer of the cerium compound (shown as "Ce—Zr" in Table 5) as shown in Table 5. In addition, the amount of the oxides of iron, chromium and titanium to be added was set to as Sample No. 30 in Example 1. Then, each of the zirconia sintered body of the present invention of Samples Nos. 50 to 56 was obtained by the manufacturing condition the same as Example 1.

Then, using each zirconia sintered body of Samples Nos. 50 to 56, each of the composition, the three point bending strength, the values of the lightness index L*, the chromaticness indices a* and b* in color space of CIE1976 L*a*b* of the surface thereof was measured as described in Example 1. Then, the proportion of the zirconia containing the stabilizer of the yttrium compound to the zirconia containing the stabilizer of the cerium compound was determined by analyzing through the Rietveld method using the data of X-ray diffraction (XRD) measurement. Furthermore, with regard to Samples Nos. 50 to 56, each zirconia sintered body was placed in a drying chamber and heated at a temperature of 150° C. for 100 hours and then each surface thereof was measured by X-ray diffraction, thereby each of the proportions of the tetragonal phase as well as the cubic and monoclinic phases present in the zirconia crystal phase was measured. With regard to each result, each composition is shown in Table 5 and each values of various properties and the proportions of the tetragonal phase as well as the cubic and monoclinic phases present in the zirconia crystal phase on the surface of the zirconia sintered body after heated is shown in Table 6.

TABLE 5

| | composition | | | | | | | | |
|---|---|---|---|---|---|---|---|---|---|
| No. | total amount of zirconia (parts by mass) | proportion of Y—Zr(1) (% by mass) | proportion of Ce—Zr(2) (% by mass) | oxides of iron (parts by mass) | oxides of chromium (parts by mass) | oxides of titanium (parts by mass) | proportion of oxides of iron (% by mass) | proportion of oxides of chromium (% by mass) | proportion of oxides of titanium (% by mass) |
| 50 | 70 | 0 | 100 | 27 | 2.4 | 0.6 | 90 | 8 | 2 |
| 51 | | 1 | 99 | | | | | | |
| 52 | | 3 | 97 | | | | | | |
| 53 | | 10 | 90 | | | | | | |
| 54 | | 20 | 80 | | | | | | |
| 55 | | 33 | 57 | | | | | | |
| 56 | | 34 | 66 | | | | | | |

(1)Y—Zr refers to the zirconia that contains the stabilizer of an yttrium comound
(2)Ce—Zr refers to the zirconia that contains the stabilizer of a cerium compound

TABLE 6

| | properties | | | | crystal phase of zirconia after heating | |
|---|---|---|---|---|---|---|
| | three point bending | lightness | chromaticness indices | | proportion of tetragonal and cubic crystal | proportion of the monoclinic |
| No. | strength (MPa) | index L* | a* | b* | phases (%) | crystal phase (%) |
| 50 | 750 | 2.7 | 0.3 | −1.5 | 100 | 0 |
| 51 | 790 | 2.9 | 0.4 | −1.3 | 100 | 0 |
| 52 | 820 | 3.0 | 0.4 | −1.2 | 100 | 0 |
| 53 | 845 | 3.1 | 0.5 | −1.0 | 100 | 0 |
| 54 | 860 | 3.2 | 0.6 | −0.9 | 98 | 2 |
| 55 | 875 | 3.4 | 0.6 | −0.8 | 95 | 5 |
| 56 | 880 | 3.6 | 0.7 | −0.7 | 93 | 7 |

As shown in Tables 5 and 6, among the zirconia containing the stabilizer, Samples Nos. 52 to 55 which comprised 3 to 35% by mass of the zirconia containing the stabilizer of yttrium compound and 65 to 97% by mass of the zirconia containing the stabilizer of cerium compound had higher values in three point bending strength rather than Samples Nos. 50 and 51 which comprised less than 3% by mass of the zirconia containing the stabilizer of yttrium compound that had an improved mechanical properties. In addition, Samples Nos. 52 to 55 had the proportion of the cubic and monoclinic phases in the zirconia crystal phase on the surface of the zirconia sintered body after heated not less than 95% so that they had deterioration resistance to the heat. Thus, it was confirmed that each zirconia sintered body of Samples Nos. 52 to 55 was suitably used for the jigs that were used in the manufacturing processes or assembling processes of the magnetic heads, which were used under the circumstance where heat was repeatedly applied.

Example 3

Following the manufacturing condition of Sample No. 31 in Example 1, a compact was formed. Then, the compact was subjected to the sintering process, wherein sintering was performed at each temperature of 1250° C., 1300° C., 1350° C., 1450° C. and 1500° C. for 2 hours. Thus each zirconia sintered body of Samples Nos. 57 to 61 was obtained. Then, similar to Example 1, the zirconia sintered body was subjected to the tests for measuring the proportion of the cubic and monoclinic phases in the zirconia crystal phase on the mirror polished surface of the zirconia sintered body, the average particle diameter, three point bending strength, the fracture toughness value, the volume specific resistance value, and the values of the lightness index L* and the chromaticness indices a* and b* in color space of CIE1976 L*a*b* of the surface thereof. With regard to each result, each of the composition, the sintering temperature, the crystal phase of the zirconia and the average particle diameter is shown in Table 7 and each values of various properties is shown in Table 8.

TABLE 7

| | composition | | | | | crystal phase of zirconia | average crystal diameter | |
| --- | --- | --- | --- | --- | --- | --- | --- | --- |
| No. | zirconia (parts by mass) | oxides of iron (parts by mass) | oxides of chromium (parts by mass) | oxides of titanium (parts by mass) | sintering temperature (° C.) | proportion of tetragonal and cubic crystal phases (%) | zirconia (μm) | oxides of iron, chromium and titanium (μm) |
| *57 | 70 | 26 | 3 | 1 | 1250 | 89 | 0.3 | 0.4 |
| 58 | | | | | 1300 | 99 | 0.3 | 0.5 |
| 59 | | | | | 1350 | 98 | 0.4 | 1.2 |
| 60 | | | | | 1450 | 95 | 0.4 | 2.0 |
| *61 | | | | | 1500 | 88 | 0.6 | 3.0 |

*outside the scope of the present invention

TABLE 8

| | properties | | | | | | |
| --- | --- | --- | --- | --- | --- | --- | --- |
| | three point bending | fracture toughness | volume specific resistance | voltage decay time | lightness | chromaticness indices | |
| No. | strength (MPa) | value (MPa·m$^{1/2}$) | value (ohm-cm) | (sec) | index L* | a* | b* |
| *57 | 678 | 3.9 | 4.6*10$^7$ | 0.22 | 7 | 2.1 | 0.1 |
| 58 | 961 | 4.2 | 6.3*10$^5$ | 0.06 | 5 | 1.6 | −0.3 |
| 59 | 986 | 4.3 | 5.7*10$^5$ | 0.06 | 4 | 0.7 | −0.5 |
| 60 | 967 | 4.4 | 5.1*10$^5$ | 0.05 | 3 | 0.8 | −1.6 |
| *61 | 823 | 3.8 | 8.5*10$^4$ | <0.02 | 3 | 0.7 | −1.8 |

*outside the scope of the present invention

As shown in Tables 7 and 8, the sintered product of Sample No. 57 was not sufficiently sintered, since it was sintered at a temperature of 1250° C., which sintering temperature was too low. Thus, Sample No. 57 had an average particle diameter of the oxides of iron, chromium and titanium of 0.4 μm and so low value of the value of the mechanical properties, in particular, the three point bending strength, which was 678 MPa. With regard to Sample No. 61, since it was sintered at a temperature of 1500° C., which sintering temperature was too high, the average particle diameter of the oxides of iron, chromium and titanium increased to 3 μm due to the grain growth of the oxides of iron and decreased mechanical properties were found.

To the contrary, with regard to Samples Nos. 58 to 60, wherein each of which was sintered at a temperature of 1300° C., 1350° C., 1450° C., it was found that each product had an excellent mechanical properties due to having the three point bending strength of not less than 950 MPa and the fracture toughness value of not less than 4 MPa·m$^{1/2}$. In addition, it had the volume specific resistance value in the range from $10^5$ to $10^7$ ohm-cm and the voltage decay time in the range from 0.02 to 0.1 seconds, so that it was found to have the semi-conductivity. Furthermore, it was confirmed that the zirconia sintered body had the values of the lightness index L* not more than 5, the chromaticness index a* not less than 0 nor more than 2, and the chromaticness index b* not less than −2 nor more than 0 in the color space of CIE1976 L*a*b* of the surface thereof.

Using the zirconia sintered body of the present invention manufactured according to the production method of the zirconia sintered body of the present invention, the vacuum and the tweezers each of which was a member of an electronic component mounting apparatus to be used for mounting the chip form electronic parts onto a circuit board were manufactured. Then, each product successfully accomplished downsizing and forming the thinner wall thickness and the lighter weight rather than the conventional ones. In addition, the frequency of forming of cracks during handling or contacting with the chip form electronic parts or the magnetic heads, which were works, was lowered. Furthermore, the zirconia sintered body became capable of dissipating static electricity at moderate rate, so that it could be suitably used for a work or an apparatus with arising few failures therein and the conveying time of the works could be shortened. In addition, since the vacuum nozzle, which was formed from the zirconia sintered body of the present invention, could be made to have a color tone similar to onyx black which was different from that of the chip form electronic parts, the frequency of causing erroneous image recognition by the CCD camera was decreased. Therefore, it was confirmed to be suitably used since decreasing of the operating rate of the electronic component mounting apparatus was avoided.

The invention claimed is:

1. A zirconia sintered body comprising:
   a zirconia in the range from 66 to 90 parts by mass, the zirconia containing an yttrium compound as a stabilizer; and
   oxides of iron, chromium and titanium in total in the range from 10 to 34 parts by mass,
   wherein among the oxides of iron, chromium and titanium, a proportion of the oxides of iron is in the range from 70 to 99.5% by mass, a proportion of the oxides of chromium is in the range from 0.4 to 20% by mass and a proportion of the oxides of titanium is in the range from 0.1 to 10% by mass,
   wherein the combined proportion of tetragonal and cubic crystal phases in the zirconia crystal phase is not less than 90%, and
   wherein the zirconia has an average crystal grain size of from 0.3 to 0.5 μm and the oxides of iron, chromium and titanium have an average crystal grain size of from 0.5 to 2.0 μm.

2. The zirconia sintered body according to claim 1, having a three point bending strength of not less than 950 MPa.

3. The zirconia sintered body according to claim 1, having a fracture toughness value of not less than 4 MPa·m$^{1/2}$.

4. The zirconia sintered body according to claim 1, having a volume specific resistance value in the range from $10^5$ to $10^7$ ohm-cm.

5. The zirconia sintered body according to claim 1, having a voltage decay time in the range from 0.02 to 0.1 seconds.

6. The zirconia sintered body according to claim 1, having the values of the lightness index L* not more than 10, the chromaticness index a* not less than 0 nor more than 2, and the chromaticness index b* not less than −2 nor more than 0 in the color space of CIE1976 L*a*b* of a surface of the sintered body.

7. The zirconia sintered body according to claim 1, having a proportion of the zirconia containing the yttrium compound as the stabilizer in the range from 3 to 35% by mass and a proportion of the zirconia containing a cerium compound as the stabilizer in the range from 65 to 97% by mass among the zirconia containing the stabilizer.

8. A method of manufacturing the zirconia sintered, body according to claim 1 comprising:
   weighing 66 to 90 parts by mass of a zirconia powder which contains the stabilizer and, after being added with a solvent, pulverizing the zirconia powder so as to have an average crystal grain size in the range from 0.2 to 0.5 μm, thereby obtaining a first slurry;
   weighing the oxides of iron, cerium and titanium in total in an amount of 10 to 34 parts by mass as oxides so as to contain, among the oxides of iron, chromium and titanium, a proportion of the oxides of iron in the range from 70 to 99.5% by mass, a proportion of the oxides of chromium in the range from 0.4 to 20% by mass, a proportion of the oxides of titanium in the range from 0.1 to 10% by mass and pulverizing the oxides of iron, cerium and titanium so as to have an average crystal grain size in the range from 0.1 to 0.5 μm, thereby obtaining a second slurry;
   mixing the first slurry with the second slurry and drying after being added with a binder, thereby obtaining granules;
   obtaining a green compact using the granules; and
   sintering the compact at a temperature range from 1300 to 1450° C. under an oxidizing atmosphere.

9. A zirconia sintered body comprising:
   a zirconia in the range from 66 to 90 parts by mass, the zirconia containing a cerium compound as a stabilizer; and
   oxides of iron, chromium and titanium in total in the range from 10 to 34 parts by mass,
   wherein among the oxides of iron, chromium and titanium, a proportion of the oxides of iron is in the range from 70 to 99.5% by mass, a proportion of the oxides of chromium is in the range from 0.4 to 20% by mass and a proportion of the oxides of titanium is in the range from 0.1 to 10% by mass,
   wherein the combined proportion of tetragonal and cubic crystal phases in the zirconia crystal phase is not less than 90%, and wherein the zirconia has an average crystal grain size of from 0.3 to 0.5 µm and the oxides of iron, chromium and titanium have an average crystal grain size of from 0.5 to 2.0 µm.

10. The zirconia sintered body according to claim 9, having a three point bending strength of not less than 950 MPa.

11. The zirconia sintered body according to claim 9, having a fracture toughness value of not less than 4 MPa·m$^{1/2}$.

12. The zirconia sintered body according to claim 9, having a volume specific resistance value in the range from $10^5$ to $10^7$ ohm-cm.

13. The zirconia sintered body according to claim 9, having a voltage decay time in the range from 0.02 to 0.1 seconds.

14. The zirconia sintered body according to claim 9, having the values of the lightness index L* not more than 10, the chromaticness index a* not less than 0 nor more than 2, and the chromaticness index b* not less than −2 nor more than 0 in the color space of CIE1976 L*a*b* of a surface of the sintered body.

15. The zirconia sintered body according to claim 9, having a proportion of the zirconia containing a yttrium compound as the stabilizer in the range from 3 to 35% by mass and a proportion of the zirconia containing the cerium compound as the stabilizer in the range, from 65 to 97% by mass among the zirconia containing the stabilizer.

16. A method of manufacturing the zirconia sintered body according to claim 1 comprising:

weighing 66 to 90 parts by mass of a zirconia powder which contains the stabilizer and, after being added with a solvent, pulverizing the zirconia powder so as to have an average crystal grain size in the range from 0.2 to 0.5 µm, thereby obtaining a first slurry;

weighing the oxides of iron, cerium and titanium in total in an amount of 10 to 34 parts by mass as oxides so as to contain, among the oxides of iron, chromium and titanium, a proportion of the oxides of iron in the range from 70 to 99.5% by mass, a proportion of the oxides of chromium in the range from 0.4 to 20% by mass, a proportion of the oxides of titanium in the range from 0.1 to 10% by mass and pulverizing the oxides of iron, cerium and titanium so as to have an average crystal grain size in the range from 0.1 to 0.5 µm, thereby obtaining a second slurry;

mixing the first slurry with the second slurry and drying after being added with a binder, thereby obtaining granules;

obtaining a green compact using the granules; and sintering the compact at a temperature range from 1300 to 1450° C. under an oxidizing atmosphere.

\* \* \* \* \*